Dec. 30, 1952 W. C. BROEKHUYSEN 2,623,741
ELECTROMAGNETIC BALANCE
Filed June 11, 1946 6 Sheets-Sheet 2

INVENTOR
WILLIAM C. BROEKHUYSEN
BY Wentworth B. Clapham
ATTORNEY

Dec. 30, 1952 W. C. BROEKHUYSEN 2,623,741
ELECTROMAGNETIC BALANCE
Filed June 11, 1946 6 Sheets-Sheet 6

INVENTOR
WILLIAM C. BROEKHUYSEN
BY Wentworth B. Clapham
ATTORNEY

Patented Dec. 30, 1952

2,623,741

UNITED STATES PATENT OFFICE 2,623,741

ELECTROMAGNETIC BALANCE

William C. Broekhuysen, Garden City, N. Y., assignor to American Machine and Foundry Company, a corporation of New Jersey Application June 11, 1946, Serial No. 675,894

14 Claims. (Cl. 265—70)

This invention relates to an electromagnetic balance or scale, and more particularly a high-speed electrically controlled weighing device which may be used in connection with a cigarette making machine in order to determine with great rapidity the relative weights of cigarettes issuing from the cigarette machine, and which is provided with mechanism for classifying cigarettes in relation to a predetermined standard weight cigarette. The scale is so connected and synchronized with the operation of a cigarette making machine or other suitable source of supply of cigarettes to be weighed that each cigarette coming from the machine is weighed and directed into its proper weight classification in great rapidity. Although the mechanism described herein is shown in connection with a continuous cigarette making machine, the use of the scale which forms a part of the invention is not so limited because obviously it can be used in other capacities.

Heretofore in the manufacture of cigarettes, weighing devices for weighing cigarettes issuing from cigarette machines have been relatively slow and in most instances it has been necessary to place cigarettes to be weighed manually on scale pans and remove them therefrom. This practice has, therefore, been quite costly and at the same time because of the limited nature of tests made, has not given a true picture to the manufacturer of the relative weights of cigarettes being made.

The present invention, therefore, solves this problem by providing an extremely rapid automatic weighing device which in addition to weighing each cigarette fed to the scale pan has associated therewith mechanism for discriminating according to weight variations and for diverting or counting cigarettes of varying weights into several classifications. For instance, a predetermined standard weight may be set as twenty-six cigarettes per ounce, with cigarettes running more than a certain percentage above and below that figure as "high" and "low" weight cigarettes, respectively.

If such classification be decided upon, the mechanism of the present invention is so constructed and arranged that all cigarettes above or below the predetermined standard will be counted according to predetermined "heavy" and "light" values. This arrangement not only makes possible a more exacting control of the operation of a cigarette machine but also makes it possible for a manufacturer to know, merely by reference to the counters, what numbers of cigarettes are above or below standard.

It is, therefore, an object of my invention to provide an extremely rapid weighing and discriminating device which can be used in connection with a cigarette machine or the like, and a hopper containing cigarettes or other articles to be weighed and wherein each cigarette or article is weighed before being conveyed to a collecting device where cigarettes or articles are prepared for the packaging machines.

Other objects of my invention will be set forth in the following description and drawings which illustrate preferred embodiments thereof, it being understood that the above statement of the objects of my invention is intended generally to explain the same without limiting it in any manner.

With these and other objects not specifically mentioned in view, the invention consists in certain combinations and constructions which will be hereinafter fully described, and then set forth in the claims hereunto appended.

As stated above, the purpose of the invention is to provide an apparatus for rapidly weighing and for rapid automatic recording of weights or for automatic sorting according to weight, particularly of very light objects or materials, such for instance as cigarettes.

The principles of the invention can be applied to the continuous measurement and recording of forces due to causes other than gravity, for example: in hydrostatic or aerodynamic tests. More specifically, the invention constitutes a balance with a much shorter natural period of oscillation and a much higher degree of damping than can be obtained by purely mechanical means. From what is described herein, it will be evident that the invention teaches a method of suspension for a scale pan or balance which is not affected by dust, corrosion, or wear such as in the case of knife edges and which is substantially frictionless and exerts substantially no return torque. If desired, a spring-supported floating base may be provided which eliminates the effect of vibration. The electric circuit forming a part of the operating means for my scale mechanism includes a two-step, self-biased direct-current amplifier which I have found in repeated tests to be quite stable in operation.

Figure 1:
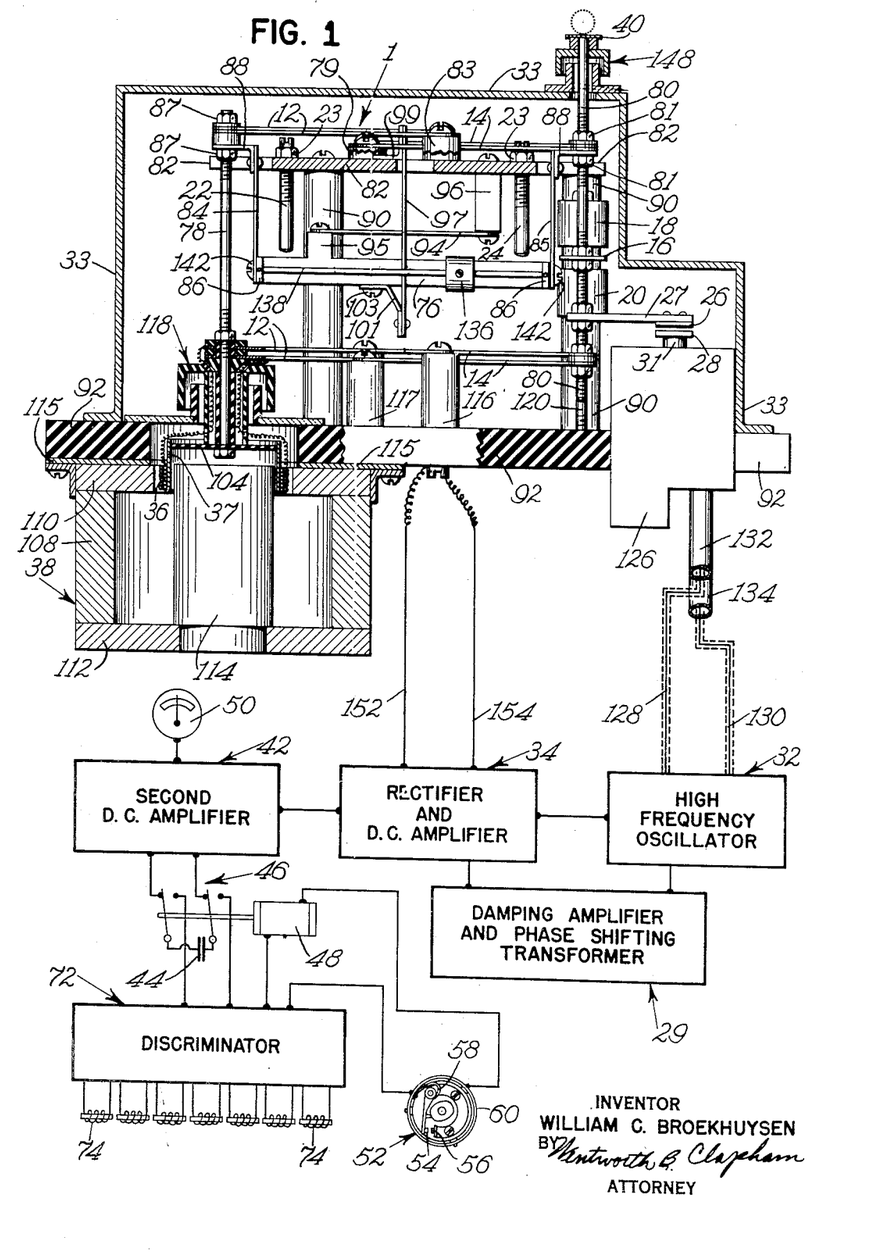
Figure 1 is a sectional side elevation, partly diagrammatic, showing a preferred form of the scale and the operating means therefor including the discriminator.

Referring to the drawings, in Figure 1 there is shown a preferred embodiment of the scale mechanism in which the balance units consist of a double beam scale designated generally 1, the pivots of which, in the form illustrated, consist of flat springs 12, 14, 84, 85, 94 and 97 in bending. An armature 16, preferably formed of soft iron is attached to the scale in a manner described hereinafter and moves vertically between two permanent magnets 18, 20. The distance between the two magnets is adjustable and preferably is so set that the unbalanced pull of the magnets 18, 20 when armature 16 is not located centrally therebetween, neutralizes the spring tension of the pivot springs 12, 14, 84, 85, 94 and 97 within the limited range of motion of the scale as determined by stops 22, 24, described more in detail hereinafter.

An insulated, preferably rectangular, and lightweight plate 26 is attached to an insulating strip 27, which in turn is secured to a vertical, movable rod 89 which at its top end has secured thereto the scale pan 40. Plate 26 is supported by strip 27 above two horizontally positioned stationary plates 28, 30 connected by conductors 128, 130 extending through shielded cables 132, 134 to a high frequency oscillator 32. Plates 26, 28 and 30 form two electrical condensers in series whose capacity controls the amplitude of high frequency oscillation. The output of oscillator 32 is rectified and stepped up by a direct current amplifier 34 in order to control the current in a moving coil 36 also attached to the scale (as shown in Figure 1) and moving up and down in the gap of a stationary magnet 38, which may be similar in construction to magnets used in magnetic loud speakers.

An increase in weight on scale pan 40, which as mentioned above, is attached to the top end of rod 89, increases the capacity of condensers 26, 28, 30, and the amplitude of oscillator 32. This causes a change in current in coil 36 of such polarity that the change in force exerted by magnet 38 on coil 36 opposes the change in weight on scale pan 40. When provisions are made to provide sufficient amplification, this rearrangement can be made so sensitive that the movement of scale pan 40 is limited to a few thousandths of an inch. For best results, scale pan 40 is mechanically balanced for the average or "standard" weight of articles to be weighed so that for a "standard" weight the current in coil 36 is zero and the current changes in polarity and intensity depend upon the amount of over and underweight of other similar articles being weighed. It is evident, therefore, that if a large number of articles, such for example, as a succession of cigarettes, is to be weighed, the scale can be mechanically balanced for a predetermined "standard" weight cigarette, and all cigarettes weighing more or less than the predetermined standard will cause changes in polarity and greater or lesser changes in intensity of the current in coil 36 depending on the amount of under and over-weight.

From the above it follows that any change in weight is counterbalanced entirely by a corresponding change in force exerted by the magnet 38 on coil 36. This force is proportional to the product of the field strength, number of turns of wire on coil 36, and current. The first two being constant, the change in weight and current are directly proportional under balanced conditions, and the coil current is independent of any factors such as slow variations in line voltage, tube characteristics, and changes in circuit constants due to heat and atmospheric conditions.

Since the current in balance coil 36 and, therefore, the forces of magnet 38 on this coil are substantially proportional to and 180° out of phase with the vertical displacement of scale 1, the balance has a strong tendency to break into mechanical oscillation, and as the change in force can be made large for a very small displacement, the frequency of oscillation can be made quite high. Therefore, in order to prevent such oscillation it is necessary to introduce another or a damping force which is always opposed to the velocity of the scale, or in other words 180° out of phase with the velocity of the scale or 90° out of phase with the displacement.

A suitable method of providing the desired damping force is by making the form 37 on which coil 36 is wound, out of copper or aluminum. Any motion of form 37 in the gap of magnet 38 induces a current in form 37, which current opposes the motion of the scale. This force is by itself insufficient, however, and it is necessary to introduce a current component in coil 36 (or a similarly arranged coil) which is 90° out of phase with the displacement of the scale, and is zero when scale 1 is at rest. This can be effected by using a damping amplifier and phase shifting transformer, designated generally at 29, described more in detail hereinafter. The total damping of the scale can be made high enough so that after any disturbance, such as the arrival and removal of an article from scale pan 40, scale 1 will return to a steady balanced position without overshoot in a minimum length of time, or in other words, a critical damping is provided.

The voltage across coil 36 is stepped up by a second direct current amplifier 42 which charges a condenser 44 through one side of a double-pole, double-throw set of contacts 46 on a transfer relay 48. A meter or nul-indicator 50 may also be connected to amplifier 42 for visual indication of the weight of articles passing to and from the scale pan 40 and adjustment of the zero point. As soon as the scale comes to rest and condenser 44 is charged in accordance with the weight on scale pan 40, the coil of transfer relay 48 is energized through a cam operated switch 52. Switch 52, which is provided with a contact 54, is normally biased toward contact 56 by a spring 58 mounted on timer housing 60 fixed to a hub 62 secured to bracket 64 attached to the frame of the machine. Contact 56 is mounted on an adjustable support 66 in order that it may be located in proper timing adjustment relative to contact 54. A cam 68 fixed to shaft 70 separates contacts 54, 56 and breaks the circuit every time an article leaves the scale pan 40 or article supporting portion of scale 1.

Breaking the circuit in this manner at predetermined timed intervals in the operation of the scale, disconnects condenser 44 from amplifier 42 and connects it to a discriminator unit designated generally 72 which operates one out of a series of electromagnets 74 in accordance with the polarity and quantity of the charge on condenser 44. Electromagnets 74 may operate counting or tabulating units or sorting apparatus. In the present embodiment, since the scale and its operating means are illustrated in operative association with cigarette feeding mechanism, the electromagnets 74 are operative to record weight variations in cigarettes being weighed in accordance with the weight characteristics developed in a succession of cigarettes passing to and from scale pan 40.

The use of condenser 44 and transfer relay 48 has the advantage that while condenser 44 operates the discriminator unit 72 and one electromagnet 74, an article on the article support or scale pan 40 of scale 1 can be removed, and the next article to be weighed located thereon and the scale can be substantially in balance again by the time condenser 44 is reconnected to amplifier 42.

Figure 2:
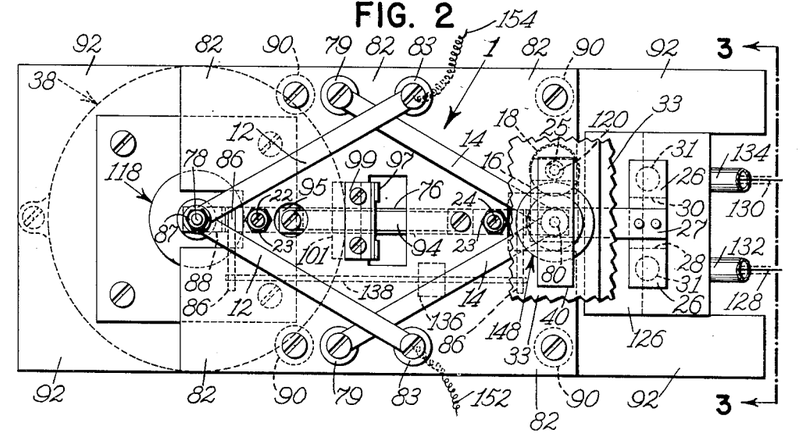
Figure 2 is a top plan view of Figure 1.
Figure 3:
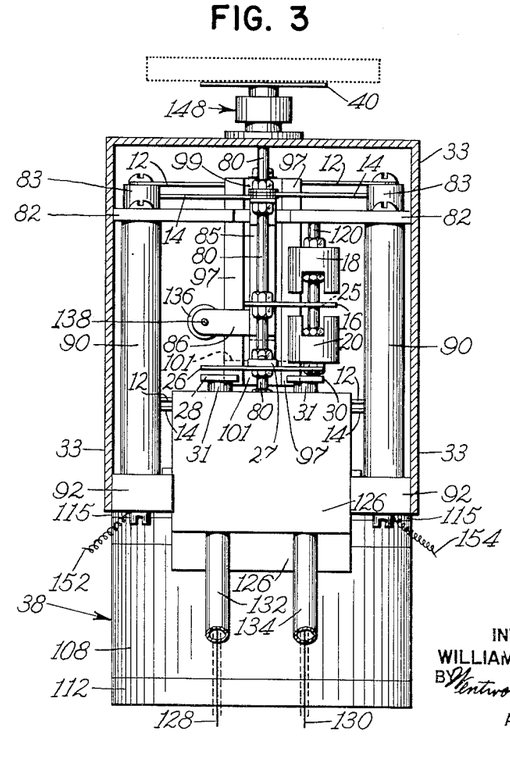
Figure 3 is a partial end view of Figure 1, with the casing section removed, to disclose the scale mechanism included therein.

The construction of a preferred form of scale is shown in Figures 1, 2 and 3. Two vertical rods 78, 80 are each attached to and maintained in the desired vertical position by two opposed sets of four leaf springs 12, 14 forming upper and lower opposed V's. Adjustably mounted near the upper ends of rods 78, 80 are brackets 83. To one of the brackets is secured one end of a flat spring 84. To the other bracket is attached a similar spring 85. The lower ends of springs 84, 85 are secured to a rigid beam 76 which, as shown, is mounted in a substantially horizontal plane. Frame plate 82 is secured to the tops of spaced posts 99 which are attached to base plate 92. Base plate 92 which supports the scale mechanism can be attached in any desired manner to any suitable frame or supports (not shown). Preferably the frame or supports on which the scale is mounted is of a type which can prevent transmission of any vibration to the scale. Base plate 92 preferably is constructed of a non-conducting material such as Bakelite, hard rubber, Micarta, or other suitable well-known insulating material. If, however, suitable insulation is provided for the current carrying parts of the scale, base plate 92 may be formed of a conducting material such as iron or steel.

A horizontal leaf spring 94 attached at one end to a projection 95 on beam 76 and at its other end to post 96 fixed to the underside of plate 82 tends to prevent longitudinal movement of beam 76. Spaced depending flat springs 97 are attached to a bracket 99 mounted on frame plate 82. Springs 97 extend downwardly through an opening in plate 82 and are secured at their lower ends to a bracket 101 which is fastened by screws 103 to beam 76. In effect, beam 76 pivots around the intersection of leaf springs 94 and 97.

Adjustable stop screws 22, 24 are mounted in spaced relationship in frame plate 82 and provided with threads in order that by means of nuts 23, stop screws 22, 24 can be set at any desired position with respect to the end portions of beam 76 and thereby limit its swing.

A disk 104 is mounted on the lower end of rod 78. Disk 104 is formed of a non-conducting or insulating material such as Bakelite or like material. A cylinder or form 37 formed of a high conducting metal such as aluminum or copper is mounted in any suitable manner on disk 104. As shown in Figure 1, cylinder 37 is pressed onto disk 104. Coil 36 which is wound about cylinder 37 preferably consists of two or three layers of turns of very fine enameled wire. The size of wire and number of turns depend upon the impedance desired. Experience has shown that in the limited space available between disc 110 and core 114 the smallest size of wire and largest number of turns will still result in a coil of fairly low impedance. Cylinder 37 moves freely in the cylindrical gap of permanent magnet 38, which in the illustrated form, consists of a hollow cylinder 108, preferably made of Alnico, a well known nickel, cobalt, and iron alloy, or similar material, two soft steel disks 110, 112 and a soft steel core 114, all suitably secured together and attached in any desired manner to plate 115 which is fastened by screws to the underside of base plate 92 (as shown in Figure 1). A suitable labyrinth seal 118 prevents access of dust to the magnet gap. The two leads of coil 36 are connected to the ends of two of the lower leaf springs 12—12 (as shown in Figures 1 and 2).

One end of each of the lower set of springs 12 is adjustably attached to, but insulated from, rod 78 (as shown in Figure 1), the other ends of these springs 12 are secured to posts 116 formed of conducting material and attached to the top face of base plate 92. One end of each of the upper set of leaf springs 12 is adjustably secured by nuts 87 to rod 78. The other ends of the same springs are secured to posts 83 fastened to the top face of frame plate 82. One end of each of the upper set of springs 14 is adjustably attached to rod 80 by nuts 81. The other ends of these springs are secured to posts 79 fastened to frame plate 82. The lower set of leaf springs 14 are mounted in a similar manner. That is, rod 80 is adjustably supported by one end of each of these springs; the other ends thereof are attached to posts 117 secured to base plate 92.

Since it is desired that each article of the succession be weighed in rapid order as it is delivered by a feeding mechanism from a source of supply, such as a cigarette machine or a hopper 260 (shown in Figure 6) when the mechanism forming the present invention is employed for weighing a succession of cigarettes, there is attached to the top end of scale rod 80 an elongated article supporting plate or scale pan 40. The shape and length of plate 40 is sufficient to allow it to receive and support cigarettes delivered thereonto and removed therefrom. Obviously any other scale pan could be used dependent upon the use to which the machine is put, or if desired, certain characteristics of an object being tested could be obtained if the object were attached directly to rod 80.

As mentioned hereinabove, armature 16 is attached to rod 80. This armature preferably is made of material having very low hysteresis, such as soft iron, or Hipernic, a high-permeability steel made by Western Electric Corporation, East Pittsburgh, Pennsylvania, or like material.

Spaced above and below armature 16 are the two U-shaped permanent magnets 18, 20, hereinabove referred to, which magnets are adjustably supported on a vertical rod 120 passing through an opening 25 in armature 16. The distance between magnets 18, 20 is adjusted until the pull of the magnets balances the combined tension of all leaf springs 12, 14, 84, 85, 94 and 97 for any position of beam 76 within the set limits of stop screws 22, 24, mentioned hereinabove. For best permanent adjustment, the several leaf springs preferably are made of a material, such as Elinvar, which contains thirtythree percent nickel with small percentages of chromium, tungsten, magnesium, silicon and carbon. This material has a constant modulus of elasticity over a temperature range of 1 to 100° F. as well as a very low coefficient of expansion. Obviously any other suitable material having similar characteristics can be used and the same result obtained.

A strip of insulating material 27 clamped to rod 80 and extending outwardly therefrom in a substantially horizontal plane has a light metal plate 26 secured to its free end (see Figures 1 and 2). Spaced beneath plate 26 but not in contact therewith, are two fixed plates 28, 30 mounted on posts 31 made of non-conducting or insulating material such as Bakelite, hard rubber, or the like, supported on block 126. Plates 28, 30 are connected to conductors 128, 130 located in shielded flexible cables 132, 134 extending upwardly through bores in posts 31. The other ends of conductors 128, 130 lead into high frequency oscillator 32 (above mentioned).

A relatively small movable weight 136 is adjustably mounted for movement along rod 138 in order to adjust the final balance of the scale according to the predetermined "standard" weight article to be weighed. The ends of rod 138 are supported in brackets 86 secured by screws 142 to both ends of beam 76. A reference to Figures 1 and 2 will show that rod 138 is substantially parallel with scale beam 76. A cover 33 preferably made of sheet metal, such as steel, surrounds the entire scale assembly except scale pan 40. A suitable labyrinth seal 148 prevents the entrance of dust around rod 80.

Figure 4:
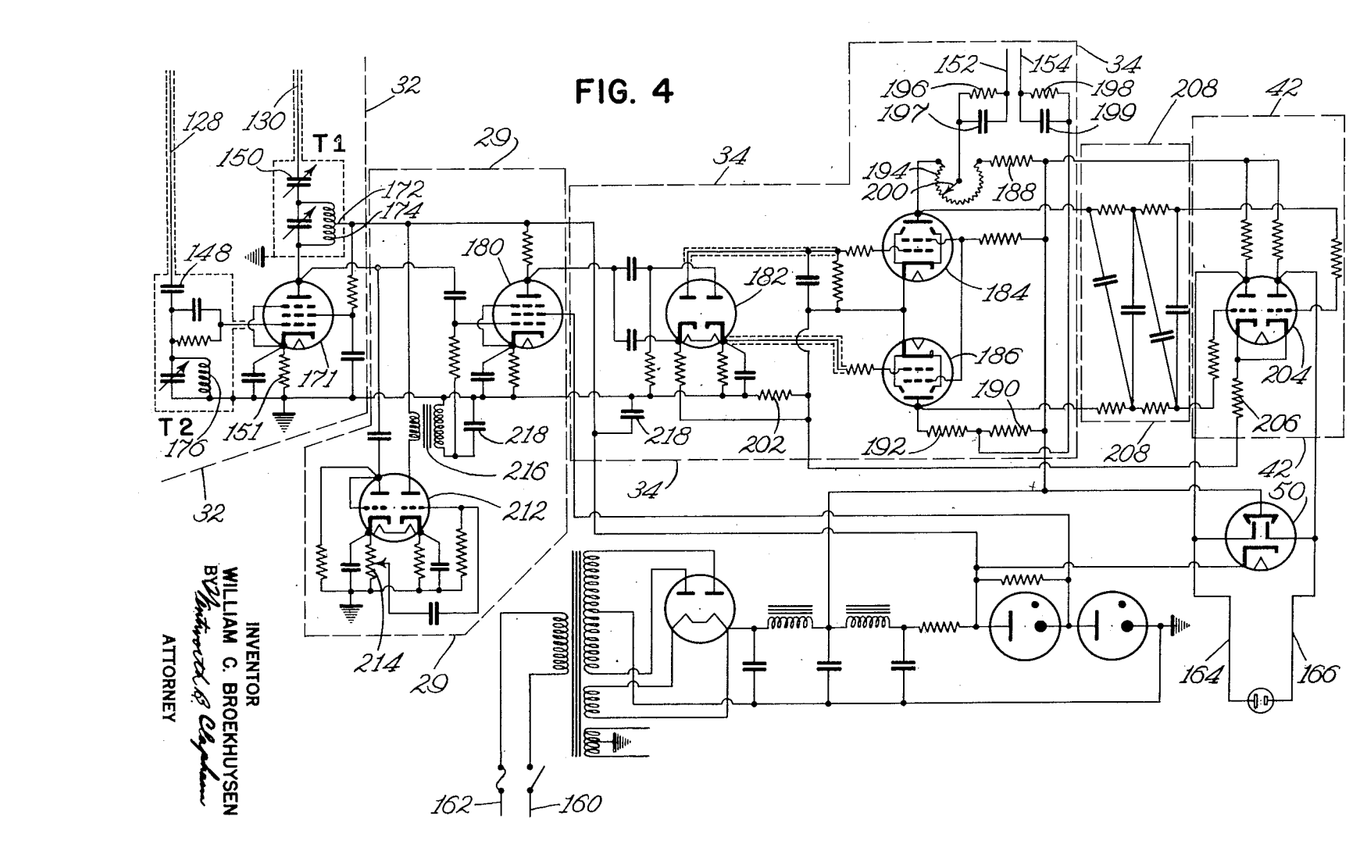
Figure 4 is a view showing the wiring diagram of the scale operating mechanism.
Figure 5:
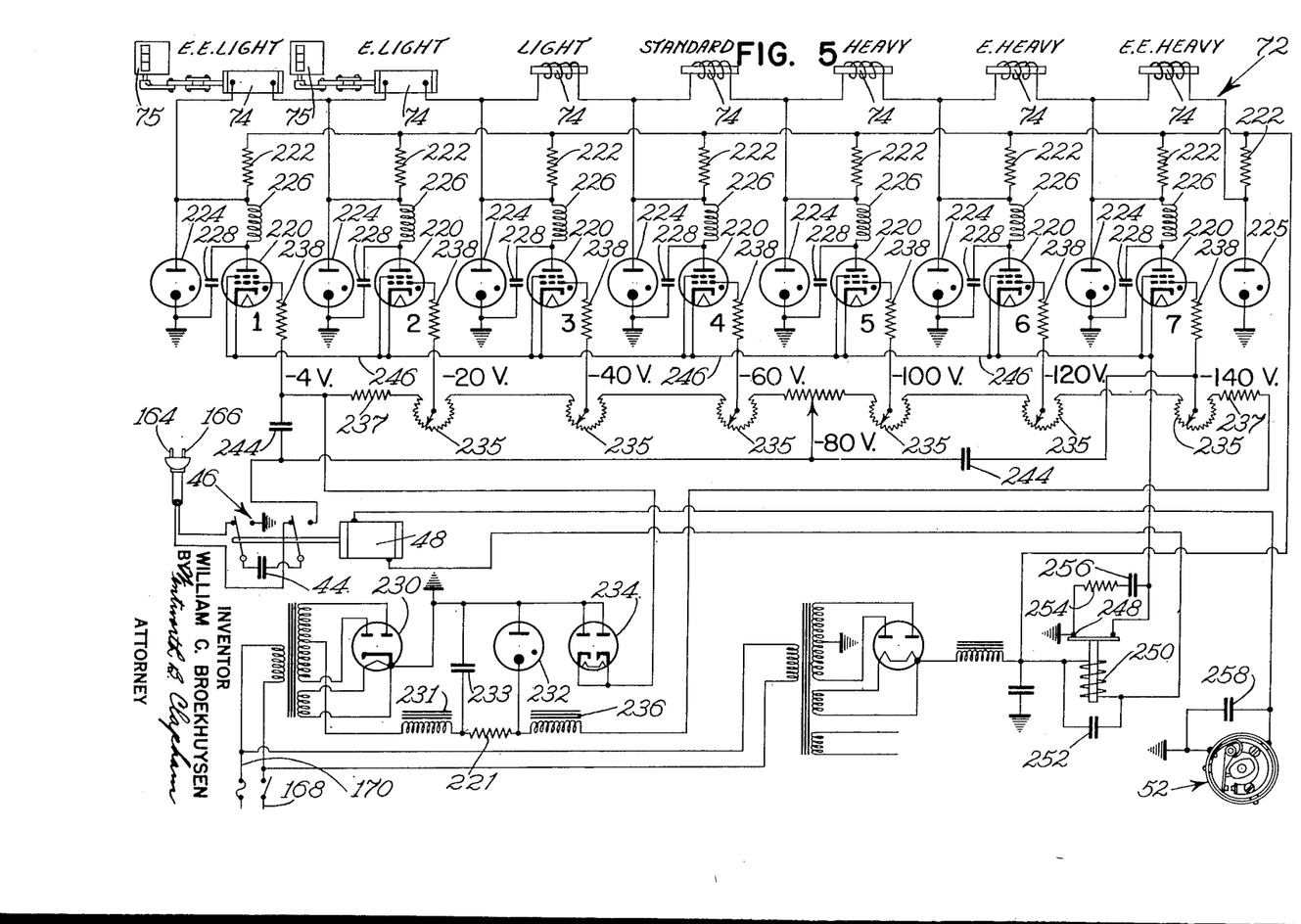
Figure 5 is a view showing the wiring diagram of the discriminating unit.

Figures 4 and 5, show wiring diagrams suitable for operating and controlling scale 1, in order to rapidly weigh a succession of articles advanced to and from scale pan 40. Figure 4 discloses oscillator 32, rectifier and amplifier 34, and amplifier 42, zero indicator 50 and power supply, energized from power supply lines 160 and 162. Figure 5 shows transfer relay 48, condenser 44, discriminator 72, electromagnets 74, and separate grid and plate power supplies energized from power supply lines 168, 170. Oscillator 32, if desired, may be similar to the well-known Hartley type. As shown in Figure 4, it uses a triple grid tube 171 with high transconductance, like the tube known under the number 6SG7. The center tap 172 of the tuned oscillator coil 174 (T1) is connected to the positive side of power supply. One end of coil 174 is connected to the plate of oscillator tube 171. The opposite end is coupled to the tuned coil 176 (T2) in the grid circuit through the capacity between plates 26, 28 and 30, and condensers 148, 150 in series with the shielded cables 132 and 134. With adjustable condenser 150 the maximum amount of coupling can be regulated. An initial negative grid bias is obtained with cathode resistor 151. This reduces the loss in the grid circuit due to the current in the grid leak. This oscillator circuit gives a smooth control of the amplitude of oscillation from zero to maximum with an extremely small movement of plate 26, provided not much load is imposed on the plate circuit. The plate is, therefore, coupled to the grid of an intermediate amplifier tube 180 of conventional design. The plate of this tube is coupled to a double-diode tube, designated 182, used as two separate half-wave rectifiers. The output voltages of the two sides of tube 182 are of opposite polarities and are connected to the grids of two power tubes 184 and 186 which form part of a D. C. bridge circuit. Two arms of the bridge consist of fixed resistors 188 and 190. The other two arms consist of the plate resistances of the two power tubes 184 and 186, one in series with a small fixed resistor 192, the other in series with a potentiometer 194 of twice the value of resistor 192. Balance coil 36 is connected by leads 152, 154 across the diagonal of this bridge (in series with resistors 196 and 198) so that with the contact arm 200 of potentiometer 194 adjusted to its center, the current in coil 36 is zero if the plate currents in tubes 184 and 186 are the same. The two cathodes of these tubes are connected to ground (the negative side of power supply being also connected to ground), through a common cathode resistor 202. The grid return of tube 186 is connected to the ground side of resistor 202, the grid return of tube 184 to the cathode end. Thus, for zero amplitude of the oscillator the plate current of tube 186 will be at its minimum value, and for tube 184 at its maximum value, and the current through coil 36 will be a maximum in the direction from 186 to 184. For fifty percent output of the oscillator 32 the grids are at the same potential and the coil current is zero. For maximum oscillator amplitude the coil current is a maximum in opposite direction. The circuit constants can be so chosen that the sum of the two plate currents and, therefore, the drop across cathode resistor 202 remains virtually constant.

As the change in voltage drop across coil 36 and resistors 196 and 198 for a given change in weight is too small to be used directly to actuate discriminator 72, the two plates of tubes 184 and 186 are connected to the two grids of the double triode designated 204 which may be of the type known as 6SN7. These two triodes are connected in a bridge which may be quite similar to tubes 184, 186 and the voltage across the diagonal of this bridge (the plates of the triodes) is used to charge the transfer condenser. The drop across the common cathode resistor 206 of the two triodes again is constant within the operating range. As the total of all plate currents of tubes 184, 186 and 204 remains practically constant, there is no feed-back due to the internal impedance of the power supply, and no tendency to oscillate at low frequency. A multi-stage resistance capacity filter 208 attenuates the 120 cycle ripple from the power supply, and also prevents sharp surges due to mechanical shock, etc., from getting through to the output.

The two plates of tube 204 are also connected to the two control electrodes of the electron-ray indicator tube designated 50. For zero output voltage, the two shadows of this tube are alike. The zero output point can be shifted over a limited range in relation to the zero coil current point by adjustment of potentiometer 194. This takes care also of minor differences between the two triodes of tube 204.

In the circuit, as described so far, the change in grid voltage of tubes 184 and 186 is substantially in phase with any change in oscillator amplitude and, therefore, with any change in position or the displacement of plate 26, and of the scale. As the impedance of coil 36 is low compared to resistances of 196 and 198, the current through coil 36 is also in phase with the displacement, which is the ideal condition for oscillation of the scale. By shunting resistors 196, 198 with suitable condensers 197, 199, current changes in coil 36 can be made to lead voltage changes on the grids of tubes 184, 186, and lead the displacement of scale 1. This acts as a strong damping force and yet does not affect the steady value of the current in coil 36.

An even greater damping effect can be obtained by a circuit addition similar to a volume expansion circuit in audio-amplifiers. This involves another twin type tube 212 which can also be a 6SN7. One half is used as a diode, which is coupled to the plate of the oscillator 171 and rectifies its output. The D. C. output is impressed across the high resistance potentiometer 214. The sliding contact of this potentiometer is coupled to the grid of the second half of tube 212 through a condenser resistor circuit which has a high time constant compared to the period of oscillation of the scale 1. The second half is used as a triode amplifier. The primary of a transformer 216 with a good response at the frequency of oscillation of the scale is connected in the plate circuit of this triode. The impedance of the primary should be low compared to the triode plate resistance, so that the plate current is substantially in phase with the grid voltage. The voltage across the primary and secondary will be 90° ahead of the plate current and, therefore, 90° ahead of the displacement of scale 1. The secondary of transformer 216 is shunted with R. F. by-pass condenser 218. The grid of tube 180 is now connected to the secondary of transformer 216. Since the amplification constant of tube 180 depends on its grid bias, any momentary change in output of transformer 216 will cause a corresponding momentary change in output of the tube 180 and in the grid voltage of tubes 184, 186. Thus any change in position of scale 1 will cause a change in the current in coil 36 which has two components, one of which is permanent if the change in position is permanent and is always 180° out of phase with the change in position, and a damping component which is zero when scale 1 is at rest and is 90° ahead of the other component while scale 1 is moving. It will be seen that the effect of this additional circuit is very similar to the effect of the condensers shunted across resistors 196, 198. Either or both of these methods of damping may be used with or without the aluminum or copper cylinder inside coil 36.

The discriminator consists essentially of a plurality of grid-controlled, gas-filled rectifiers or thyratrons 220; for example, of type 2050 or 2051. The plates of these tubes are connected to a common supply through individual resistors 222. A gas-filled voltage-regulator tube 224, for example, a V. R. 105–30 is connected between each plate and ground. A small R. F. choke 226 in series with each plate and a R. F. by-pass condenser 228 from each plate to ground prevent oscillation in the plate circuit. A series of solenoids 74 for operating counters 75 or selective or classifying apparatus (not shown) are connected between the plates of successive tubes.

The grid bias for the thyratrons is obtained from a separate supply consisting of a conventional full-wave rectifier 230 and single stage filter consisting of an iron core choke 231 and a condenser 233, grounded at the positive side, and a voltage regulator tube 232 in series with resistor 221. A bleeder circuit consisting of a number of potentiometers 235 and resistors 237 in series is connected to ground through a half wave rectifier tube 234 and to the negative terminal of the grid supply through a small iron core choke 236.

Let us assume, in order to explain the action, that the grid bias supply is 150 volts and that in the illustrated embodiment there are seven thyratrons 220, numbered 1 to 7, whose grids are connected to taps on the bleeder circuits as follows: —4, —20, —40, —60, —100, —120, and —140, volts.

High resistances 238 are connected in series with each grid. Assume also that the thyratrons will fire when their grid bias is zero. After the transfer relay 48 disconnects the transfer condenser 44 from the balance or scale circuit, it connects the condenser 44 between ground and a —80 volt tap on the bleeder circuit. Relatively large condensers 244 are connected between this tap and the —4 volt tap and between the —80 and —140 volt taps. If the charge on the transfer condenser was zero, a momentary surge of minus 80 is imposed on the entire bleeder circuit between the minus 4 and minus 140 volt taps. This surge is quickly dissipated through the choke 236, but oscillation is prevented by the half-wave rectifier 234. The duration of this surge is so short that condensers 244 do not discharge noticeably through the bleeder circuit. Thus thyratron tubes #1, 2, 3 and 4 whose grids are connected to the —4, —20, —40, —60 volt taps will fire, but the highest potential reached by the grid of tube #5 will be —20 volts, so tubes #5, 6 and 7 do not fire. If the charge on the transfer condenser 44 was more than —20 volts, the surge will be less than —60 and only tubes #1, 2 and 3 will fire, etc. For a charge of more than —76 volts, no tube will fire. For a charge of more than +20 volts, tubes #1 to 5 will fire. For a charge of more than +60 volts, all tubes will fire. It should be noted that whenever one or more thyratrons fire, their corresponding voltage regulator tubes 224 are extinguished. The plate current is, so to say, transferred from the voltage regulator tube to the thyratron, and there is only a moderate change in load on the power supply.

As the plates of all tubes that fired are at the same potential (approximately +14 volts for the 2051) and also all those that did not fire are at equal potentials (+105 for the VR 105) only one electromagnet 73 will be energized; that is, the electromagnet between the last tube to fire and the first one not to fire. The last solenoid 74 is connected between the plate of the last thyratron 220 and the plate of an extra voltage regulator tube 225 which latter is also connected to the plate supply through a resistor 222.

As mentioned hereinabove, the mechanism described can be employed for the purpose of weighing a succession of articles such as cigarettes and classify each article as weighed according to a set standard for cigarettes above or below that standard. Each of the seven magnets 74 can be connected by suitable means (not shown) to counting or ejecting device which will cause cigarettes above and below the predetermined standard to be either recorded or ejected as desired. For example, in the embodiment illustrated, seven grades or classifications of cigarettes can be determined, such as: E. E. Light, E. Light, Light, Standard, Heavy, E. Heavy and E. E. Heavy, reading from left to right in Figure 5. Applying these principles to the present machine, therefore, the operation of the mechanism can be summarized as follows: For a condenser charge of —20 to +20 volts the magnet marked "Standard" between tubes #4 and 5 will be energized. For a charge between +20 and +40 the electromagnet marked "Heavy" between tubes #6 and 5 will be energized, etc.

For a charge between —60 and —75 volts, the electromagnet marked "E. E. Light" will be energized. For a charge of more than —76 volts, no magnet is energized. In this way, it can be arranged that no magnet is energized when there is no object on the scale pan at the instant of transfer of the condenser.

The cathodes and screen grids of all thyratrons are connected to a single conductor 246, which is connected to ground through the normally closed contact 248 of relay 250. The coils of this relay and of transfer relay 48 are connected in series to the plate supply of the thyratrons. A mechanically operated timing contact 52 is connected in the ground lead of these coils. When this contact closes, transfer relay 48 is energized immediately. The operation of relay 250 is delayed, however, by a large condenser 252 connected across its coil. As a result contact 248 does not open until the thyratrons have fired, a selected magnet has been energized, and the surge in the grid circuit has died away. When it does open, the plate current in the thyratrons is interrupted and can only be restarted by another surge after contact 248 has been closed again. This contact is shunted by a small resistor 254 and condenser 256 to eliminate surges during its opening and closing. The timing contact is shunted by a condenser 258 for the same reason.

When the above described mechanism is to be used in grading cigarettes, it is necessary to make certain adjustments in order to classify the cigarettes being weighed according to a predetermined standard, those weighing more than standard and those weighing less than standard. The first adjustment made is to place a cigarette of predetermined standard weight on scale pan 40 after which potentiometer 194 is adjusted until the two shadows of the indicator tube are alike.

When the timing contact 52 is closed, the "Standard" magnet 74 is energized momentarily. The scale pan is then emptied and a "Heavy" cigarette is placed on the scale pan 40 and the corresponding grid potentiometer of the discriminator is adjusted until upon closing of the timing contact 52 the heavy magnet 74 is energized. The "heavy" cigarette just weighed is then removed from the scale pan and a cigarette corresponding to the heaviest cigarette to be weighed is placed on scale pan 40 and the grid potentiometer adjusted until upon closing of timing contact 52 the E. E. heavy magnet 74 is energized. In the same manner the weight is decreased according to predetermined lightness of cigarettes so that cigarettes varying widely from E. E. light to E. E. heavy can be weighed in rapid succession. If each magnet is connected to a counter of any conventional design, it will be evident that as cigarettes are placed in succession on scale pan 40, a count can be made of varying weights in accordance with the standard set on the potentiometers 235 varying from E. E. light through standard to E. E. heavy weights.

First, scale pan 40 is empty, the timing contact 52 is open, the condenser is connected to the scale and has a high negative charge. When an object to be weighed is deposited on the scale, pan 40 moves down an imperceptible amount, the current in coil 36 changes to a new value which reestablishes balance, the condenser charge is reduced, and in case of overweight, reversed in polarity. After sufficient time has elapsed for this charge to reach a steady state (perhaps 1/20 second), the timing contact closes, the condenser is disconnected from the scale circuit, and connected to the grid circuit of the discriminator, one or more thyratron tubes fire and a corresponding number of V. R. tubes are extinguished, one magnet is energized, contact 248 opens, the thyratron tubes are extinguished, the V. R. tubes relight, the magnet is deenergized. When this takes place, which again requires 1/20 second, the first objects have been removed from the scale and the second ones deposited so that a balanced condition is already on the way to be reestablished when the timing contact opens and the condenser is reconnected to the scale circuit.

Figure 6:
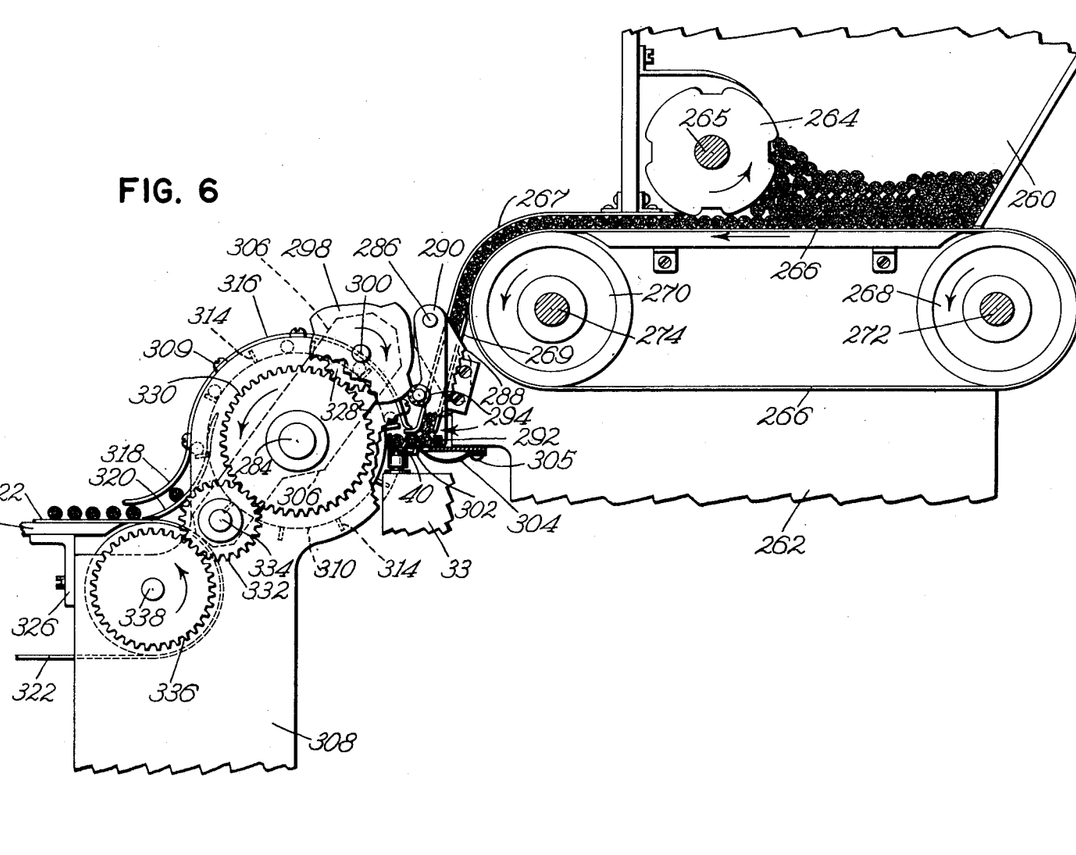
Figure 6 is a side elevation, parts broken away, disclosing mechanism for feeding cigarettes to be weighed to and from the scale.
Figures 7, 8:
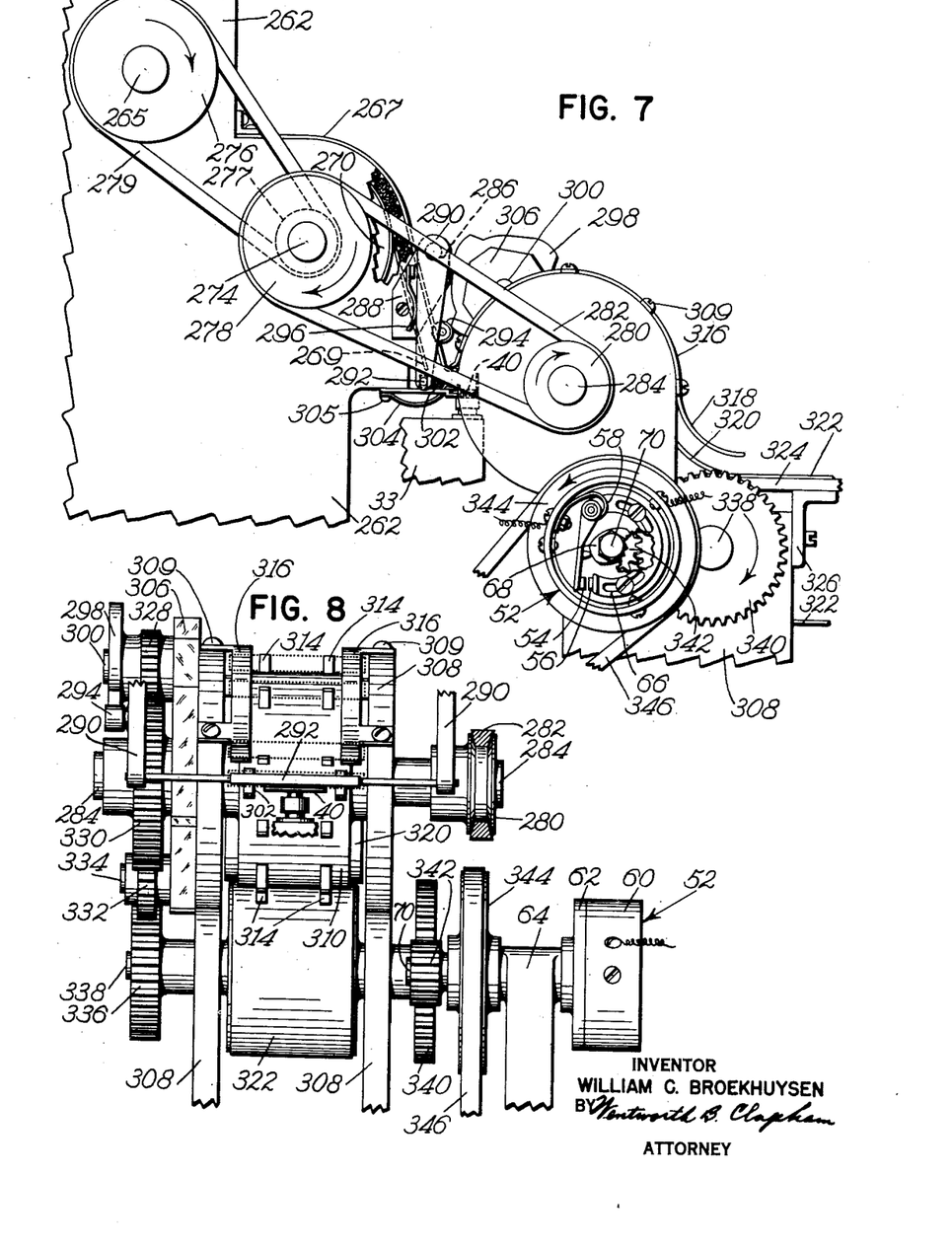
Figure 7 is a side elevation taken from the rear of Figure 6, parts broken away, to disclose elements of the timing mechanism.
Figure 8 is a front view of Figure 7.

In Figures 6, 7 and 8, there is shown a suitable mechanism for feeding cigarettes in timed relation to scale pan 40 in order that they may be weighed and classified and passed rapidly to and from scale pan 40. The mechanism selected for purposes of illustration consists of a hopper 260 supported by frame members 262. Mounted within the hopper adjacent one end thereof and spaced above belt 266 which forms the bottom of the hopper, a distance slightly greater than the maximum diameter of a cigarette, is a rotary stripper 264 fixed to a shaft 265 suitably supported by the sides of the hopper 260 for rotary movement. Stripper 264 insures the delivery of cigarettes in single row formation on belt 266 in order that they may be guided by belt 266 beneath curved guide 267 and a guide 269 spaced therefrom into position to be placed onto scale pan 40.

Belt 266 is substantially the width of hopper 260 and is supported by drums 268, 270 fixed to shafts 272, 274 suitably journalled in side frame 262. On one end of shaft 265 (Figure 7) is attached a pulley 276 over which runs a belt 279 also running a pulley 277 attached to shaft 274. A pulley 278 also attached to shaft 274 has running thereon a belt 282 which also runs on a pulley 280 attached to shaft 284. In this manner, shafts 265 and 274 are driven in proper timed relationship in a counterclockwise direction (as shown in Figure 6) in order to operate the stripper 264 and allow belt 266 to advance a row of cigarettes in rapid succession to weighing position on scale pan 40. A shaft 286 supported by brackets 288 attached to side frames 262 is provided at each end with an arm 290 which at their free ends support a transverse bar 292. One of the arms 290 (as shown in Figure 7) is provided with a cam follower 294. A spring 296 attached to a bracket 268 presses against one of the arms 290 and urges cam follower 294 into continuous engagement with a cam 298 mounted on shaft 300. Cam 298 is provided with four high and four low portions so that during the rotation of the cam for each revolution thereof pusher bar 292 moves back and forth four times to feed cigarettes to be weighed onto a scale pan 40. Obviously any desired number of high and low portions could be provided on cam 298.

For the rate of rotation of cam 298 and the speed of delivery of cigarettes to and from scale pan 40, experience has shown that a four loop cam operates satisfactorily. As each cigarette is moved downwardly between guides 267, 269, it comes to rest on a platform 302 in front of bar 292. As shown in Figure 6, three cigarettes are positioned in substantially horizontal relationship, one cigarette rests upon scale pan 40, another rests in seats provided in the ends of two spaced flat springs 304 extending upwardly through slots in the platform 302. Springs 304 are secured to the undersides of abutments or frames 262 by means of screws 305. Cam shaft 300 is suitably journalled in bracket 306 attached to side frames 308 forming a part of the feeding mechanism. A drum 310 mounted on shaft 284 supported by side frames 308 is provided with a plurality of spaced flights 314 which are adapted to move upwardly in a counterclockwise direction (as viewed in Figure 6) in order to engage the ends of cigarettes resting on scale pan 40 and move them from the scale pan upwardly beneath curved guard 316 extending between side frames 308 affixed thereto by screws 309 downwardly between guide extensions 318 and guide 320 onto belt 322 which runs along table 324 attached by brackets 326 to side frames 308. In this manner cigarettes which have been weighed are rapidly removed from the scale and delivered out of the machine. Following the removal of a weighed cigarette from scale pan 40 by a flight 314, the next cigarette to be weighed is moved from its seat in the ends of springs 304 by a cigarette which has moved downwardly between guides 267, 269 into the path of movement of pusher bar 292. On the rearward movement of pusher bar 292 a cigarette drops into the space between the cigarette on the seat in springs 304 and the face of pusher bar 292 awaiting movement on the next forward travel of pusher bar 292 onto scale pan 40. It will be remembered that magnets 74 are energized in accordance with wide graduations of cigarettes being weighed varying from EE light through standard to EE heavy and that counting mechanism can be employed which will register all cigarettes passed to and from scale pan 40 so that an accurate count of the weights of cigarettes can be maintained by certain of the mechanism described herein.

Cam 298 is driven in a clockwise direction by means of a gear 328 formed on a hub of cam 298 secured to shaft 300, which gear meshes with gear 330 on shaft 284. A gear 332 on a stud 334 supported by bracket 306 (Figure 8) meshes with gear 336 on shaft 338 journalled in side frames 308. The other end of shaft 338 is provided with a gear 340 which meshes with a gear 342 on shaft 70. By means of gear chains described and pulley 344 by a belt 346 driven from a pulley, a suitable source of power rotation is imparted to the several operated means above described. The design of the gear train is such that cigarettes are moved to and from scale pan 40 at any suitable desired rate of speed.

The invention above described may be varied in construction within the scope of the claims, for the particular device, selected to illustrate the invention, is but one of many possible concrete embodiments of the same. It is not, therefore, to be restricted to the precise details of the structure shown and described.

What I claim is:

1. In a balance, a movable member, a stationary frame, a plurality of flexing supporting elements supporting said member for movement on said frame, an armature composed preferably of low hysteresis magnetic material connected to said member, spaced stationary magnetic poles mounted on opposite sides of said armature, said poles exerting opposing forces on said armature, means for adjusting said poles relative to said armature so that the differential of the opposing forces is substantially equal to and opposed to the total force exerted by said flexing supporting elements on said moving member over the operating range of its movement.

2. In a weighing apparatus, a base, a balance mounted on said base, flexure pivots supporting said balance, magnetic means for neutralizing the return torque exerted by said flexure pivots, said means comprising spaced magnets, and an armature associated with said balance located between said magnets, a coil mounted on said balance, a magnet providing a substantially constant uniform magnetic field in which said coil moves, means for supplying a varying current to said coil proportional to variations in deflecting forces applied to said balance, means for imposing a second current component in said coil to create a force which is opposed to the movement of said balance and proportional to its velocity, a condenser, means for charging said condenser with a voltage substantially proportional to the current in said coil, means for disconnecting said condenser from said charging means, and means for measuring said charge after said condenser is disconnected from said charging means.

3. In a weighing apparatus, a base, a balance mounted on said base, flexure pivots supporting said balance, magnetic means for neutralizing the return torque exerted by said flexure pivots, said means comprising spaced magnets, and an armature carried by said balance located between said magnets.

4. In a weighing apparatus, a base, a balance mounted on said base, flexure pivots supporting said balance, magnetic means for neutralizing the return torque exerted by said flexure pivots, said means comprising spaced magnets, and an armature associated with said balance located between said magnets, a coil mounted on said balance, a magnet providing a substantially constant uniform magnetic field in which said coil moves, and means for supplying a varying current to said coil proportional to variations in deflecting forces applied to said balance.

5. In a weighing apparatus, a base, a balance mounted on said base, flexure pivots supporting said balance, magnetic means for neutralizing the return torque exerted by said flexure pivots, said means comprising spaced magnets, and an armature associated with said balance located between said magnets, a coil mounted on said balance, a magnet providing a substantially constant uniform magnetic field in which said coil moves, means for supplying a varying current to said coil proportional to variations in deflecting forces applied to said balance, and means for imposing a second current component in said coil to create a force which is opposed to the movement of said balance, and proportional to its velocity.

6. In a weighing apparatus, a base, a plurality of sets of flexible springs mounted in vertical spaced relationship on said base, two vertical rods carried by said springs, one of said rods being provided at one end with a coil, a magnetic field surrounding said coil; the other of said rods being spaced from said first-named rod, an armature secured to said second-named rod, spaced magnets mounted on opposite sides of said armature, a scale beam, means for supporting said beam between said rods for substantially pivotal movement, means for balancing said beam at a neutral position, an article support operatively connected to said second-named rod, an electric circuit, means operated by the imposition of a force on said support for causing a current to flow in said circuit and said coil of such magnitude and polarity that the force exerted by said magnetic field on said coil as a result of said current is substantially proportional to the velocity of movement of said beam and opposite in direction to said movement, and means for counterbalancing the force on said support due to the weight of an article placed thereon.

7. In an electromagnetic weighing apparatus, a balance, means for supplying a substantially constant uniform magnetic field, a coil attached to said balance and suspended in said field, means for varying the current in said coil substantially in accordance with any change in force on said balance, a condenser, means for charging said condenser with a voltage substantially proportional to the current in said coil, means for disconnecting said condenser from said charging means, and means for measuring said charge after said condenser is disconnected from said charging means.

8. In an electromagnetic weighing apparatus, a balance, means for supplying a substantially constant uniform magnetic field, a coil attached to said balance and suspended in said field, means for varying the current in said coil substantially in accordance with any change in force on said balance, a condenser, means for charging said condenser with a voltage substantially proportional to the current in said coil, means for disconnecting said condenser from said charging means, a scale pan operatively associated with said balance, means for feeding a succession of articles to be weighed onto said scale pan, means for removing weighed articles from said scale pan, and means operated by the charge on said condenser for selectively recording the weight of each article weighed in relation to a predetermined standard weight.

9. In an electromagnetic weighing apparatus, a balance, means for supplying a substantially constant uniform magnetic field, a coil attached to said balance and suspended in said field, means for varying the current in said coil in accordance with any change in weight on said balance, a scale pan operatively associated with said balance, means for feeding a succession of articles to be weighed onto said scale pan, means for removing weighed articles from said scale pan, means for recording the current flowing in said coil for each article weighed in relation to the current for a predetermined standard weight, said last-named means including a plurality of counters, an electromagnet associated with each of said counters, and selectively operated means controlled by the current in said coil for each article weighed for energizing a selected electromagnet and its counter.

10. In an electromagnetic weighing apparatus, a balance, means for supplying a substantially constant uniform magnetic field, a coil attached to said balance and suspended in said field, means for varying the current in said coil in accordance with any change in weight on said balance, a condenser, means for charging said condenser with a voltage proportional to the current in said coil, means for disconnecting said condenser from said charging means, a scale pan operatively associated with said balance, means for feeding a succession of articles to be weighed onto said scale pan, means for removing weighed articles from said scale pan, means for selectively recording the weight of each article weighed in relation to a predetermined standard weight, said last-named means including counters, electromagnets associated with each of said counters, and selectively operated means controlled by the charge of said condenser for energizing a selected electromagnet and its counter.

11. In an electromagnetic balance, a stationary frame, a member pivotally supported on said frame, a force receiving surface operatively connected to said member, a magnet mounted on said frame, means positioning said member at a neutral position, said magnet being constructed and arranged to maintain a constant magnetic flux in an air gap, a coil mounted on said member for movement in said air gap in a direction at right angles to said flux, a plate mounted on said member for movement therewith, a stationary plate, an electric circuit associated with said coil and said plates, means responsive to the application of a force to said surface for causing a current to flow in said circuit of such magnitude and polarity that the force exerted by said magnetic field on said coil as a result of said current is substantially proportional to the displacement of said member from said neutral position and in a direction opposite to said displacement.

12. In an electromagnetic balance, a stationary frame, a member pivotally supported on said frame, a force receiving surface operatively connected to said member, a magnet mounted on said frame, means positioning said member at a neutral position, said magnet being constructed and arranged to maintain a constant magnetic flux in an air gap, a coil mounted on said member for movement in said air gap in a direction at right angles to said flux, a plate mounted on said member for movement therewith, a stationary plate, an electric circuit associated with said coil and said plates, means responsive to the application of a force to said surface for causing a current to flow in said circuit of such magnitude and polarity that the force exerted by said magnetic field on said coil as a result of said current can always be resolved into two components, one of which is substantially proportional to the displacement of said member from said neutral position and in opposite directions to said displacement, the other component of said force being substantially proportional to the velocity of movement of said member and opposite in direction to said movement.

13. In an electromagnetic balance, a stationary frame, a member pivotally supported on said frame, a force receiving surface operatively connected to said member, a magnet mounted on said frame, means positioning said member at a neutral position, said magnet being constructed and arranged to maintain a constant magnetic flux in an air gap, a coil mounted on said member for movement in said air gap in a direction at right angles to said flux, a plate mounted on said member for movement therewith, a stationary plate, an electric circuit associated with said coil and said plates, means responsive to the application of a force to said surface for causing a current to flow in said circuit of such magnitude and polarity that the force exerted by said magnetic field on said coil as a result of said current can always be resolved into two components, one of which is substantially proportional to the displacement of said member from said neutral position and in opposite directions to said displacement, the other component of said force being substantially proportional to the velocity of movement of said member and opposite in direction to said movement, a condenser, means for charging said condenser with a voltage substantially proportional to the current in said coil, means for disconnecting said condenser from said charging means, and means for measuring said charge after said condenser is disconnected from said charging means.

14. In a weighing apparatus, a base, a plurality of flexible springs mounted on said base, a scale beam pivotally supported by said springs, a coil supported by said beam, a magnetic field surrounding said coil, an armature also supported by said beam, spaced magnets mounted on opposite sides of said armature, means for adjusting the position of said magnets relative to said armature to so position said magnets that the combined forces exerted by said magnets on said armature counterbalance the forces exerted by said springs on said beam over a limited range of movement of said beam, a force-receiving surface supported by said beam for movement therewith, an electric circuit, means for inducing a current in said circuit and said coil of a magnitude to create a force operative to constantly balance any change in force imposed on said surface, and means for inducing a second current component in said coil to create a force operative to oppose the motion of said coil in said field.

WILLIAM C. BROEKHUYSEN.

REFERENCES CITED

The following references are of record in the file of this patent:

UNITED STATES PATENTS

| Number | Name | Date |
|---|---|---|
| 2,067,741 | Weckerly | Jan. 12, 1937 |
| 2,081,367 | Nicolson | May 25, 1937 |
| 2,117,894 | Lenehan | May 17, 1938 |
| 2,141,175 | Dawson | Dec. 27, 1938 |
| 2,169,096 | Greenberg | Aug. 6, 1939 |
| 2,273,997 | Rubin | Feb. 24, 1942 |
| 2,329,975 | Best | Sept. 21, 1943 |
| 2,371,040 | Fisher et al. | Mar. 6, 1945 |
| 2,381,268 | Eastman | Aug. 7, 1945 |
| 2,407,513 | Pounds | Sept. 10, 1946 |
| 2,416,276 | Ruge | Feb. 18, 1947 |